United States Patent
Sciabica, Jr.

(10) Patent No.: US 6,704,416 B1
(45) Date of Patent: Mar. 9, 2004

(54) HOOK SWITCH STATUS GLITCH FILTER

(75) Inventor: Frank Sciabica, Jr., Phoenix, AZ (US)

(73) Assignee: AG Communication Systems Corporation, Phoenix, AZ (US)

( * ) Notice: Subject to any disclaimer, the term of this patent is extended or adjusted under 35 U.S.C. 154(b) by 0 days.

(21) Appl. No.: 09/535,558

(22) Filed: Mar. 27, 2000

(51) Int. Cl.$^7$ .............................................. H04M 1/00
(52) U.S. Cl. ...................................... 379/424; 379/448
(58) Field of Search ................................ 379/166, 325, 379/395, 395.01, 424, 425, 448

(56) References Cited

U.S. PATENT DOCUMENTS 3,836,730 A * 9/1974 Marshall ..................... 379/164
4,075,434 A * 2/1978 Merritt, Jr. .................. 379/161
4,636,587 A * 1/1987 Zoerner ....................... 379/377

* cited by examiner

*Primary Examiner*—Bing Bui
(74) *Attorney, Agent, or Firm*—David J. Zwick; Steven R. Santema

(57) ABSTRACT

A line card circuit using a pair of comparators such that the output of the first comparator is coupled to an input of the second comparator through an RC circuit. The RC circuit is tuned such that short transients, such as false pulses and false off hook indications passed by the first comparator are not passed by the RC circuit to the second comparator. The input of the first comparator is coupled to the subscriber line and the output of the second comparator is coupled to the switch's hook status detection circuitry.

8 Claims, 1 Drawing Sheet

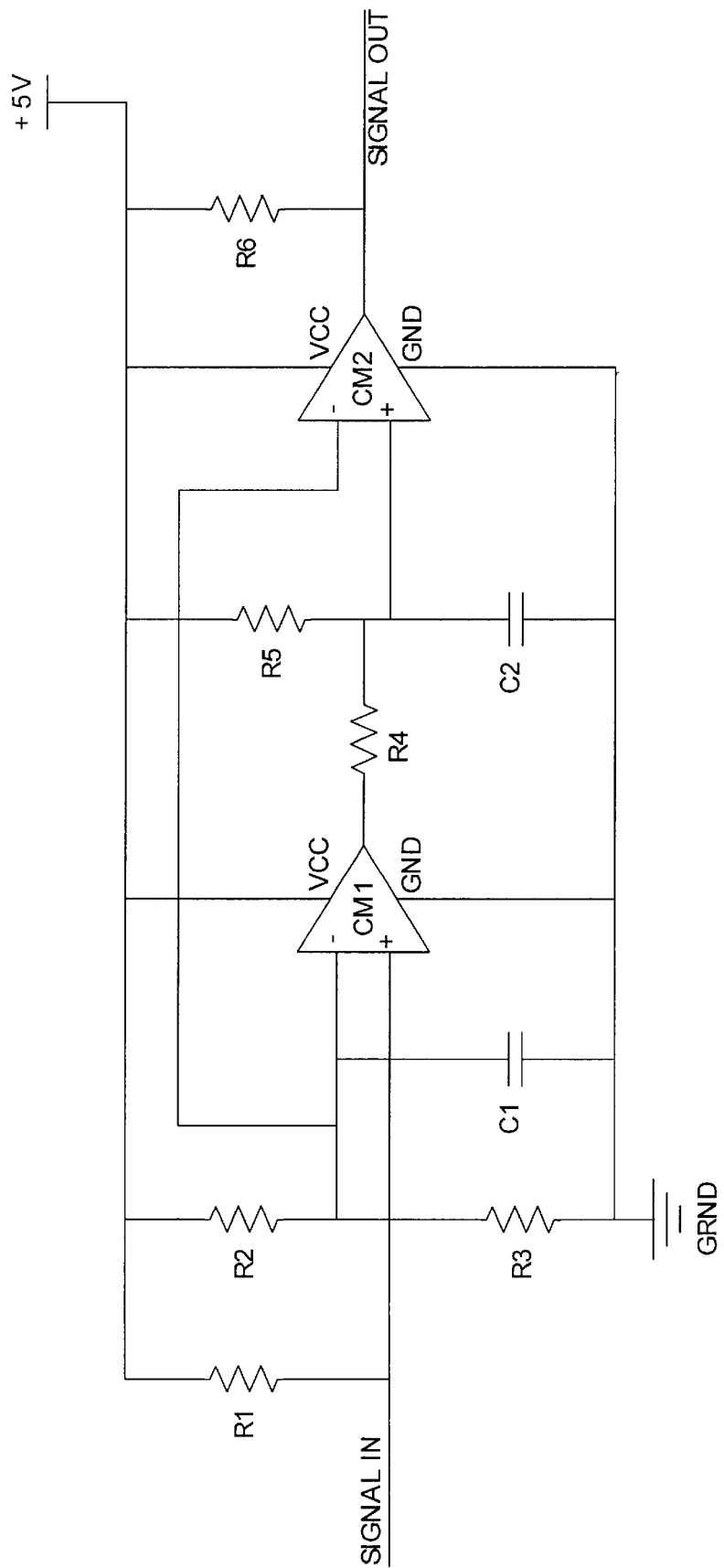

HOOK SWITCH STATUS GLITCH FILTER

FIELD OF THE INVENTION

The present invention relates to analog glitch filter circuitry, and more particularly to a hook switch status glitch filter to prevent false dial pulses and false off hook indications at the central office.

BACKGROUND OF THE INVENTION

A telephone line, or subscriber loop, provides electrical and physical connection of a subscriber telephone to the central office. The telephone may be built using components which, by their nature, are such that they may create undesirable electrical transients. These transients can adversely interfere with the expected operation of the line equipment. For example, when an off hook subscriber dials a digit using a rotary dial pulse telephone, the subscriber opens, or breaks, and closes, or makes, the loop current thereby creating temporary on hook and off hook conditions. Sequences of these makes and breaks form a pulse train that indicates to the central office the digit dialed by the subscriber. On occasion, an extra, or false, pulse may be created by the telephone dial due to the nature of the handset relay. The central office dial pulse detector must ignore these false pulses to ensure that the proper dialed digit is interpreted.

Ringing transients may also be created during the application or removal of ringing power to the loop. These transients can be so severe that they cause the central office loop status detector to falsely detect an off hook condition on the line. When the false off hook is detected, the central office removes ringing from the line.

According to Telcordia standards document GR-506-CORE, "LSSGR: Signaling for Analog Interfaces", Issue 1, June 1996, Section 10.1.4 Rejection of False Dial Pulses, the central office should ignore as a dial pulse any pulse of 2 ms or less, and, according to Section 14.1.4 Ring Trip, ignore transients of 12 ms or less as an off hook condition during the alerting state.

SUMMARY OF THE INVENTION

Accordingly, it is an object of the present invention to provide a line card circuit that will mask false pulses during digit dialing while maintaining the integrity of the dialed pulse train. Another object of the invention is to provide a line card circuit that will mask the shorter duration false off hook indications during ringing.

The invention of Applicant is a line card circuit that employs a pair of comparators arranged such that the output of the first comparator is coupled to an input of the second comparator through an RC circuit. The RC circuit is tuned such that short transients, such as false pulses and false off hook indications, passed by the first comparator are not passed by the RC circuit to the second comparator. The input of the first comparator is coupled to the subscriber line and the output of the second comparator is coupled to the switch's hook status detection circuitry.

DESCRIPTION OF THE DRAWINGS

The FIGURE shows a circuit diagram of the preferred embodiment of Applicants' invention.

DESCRIPTION OF THE PREFERRED EMBODIMENT

The FIGURE shows a circuit diagram of the preferred embodiment of Applicant's invention. A comparator CM1 receives dial pulse and off hook input signal SIGNAL IN at its positive input voltage connection CM1+. Negative input voltage connection CM1− of comparator CM1 is connected between series resistors R2 and R3, which form a simple voltage divider network between the 5 volt operating voltage and ground that supplies an intermediate voltage. The output of comparator CM1 is connected through a resistor R4 to the positive input voltage connection CM2+ of a second comparator CM2. Connection CM2+ is also connected to the 5 volt operating voltage through a resistor R5 and to ground through a capacitor C2. Resistors R4 and R5 and capacitor C2 are components of an RC circuit. Negative input voltage connection CM2− of comparator CM2 is also connected between series resistors R2 and R3. The output of comparator CM2 is the circuit output signal SIGNAL OUT. Comparators CM1 and CM2 are each powered through their respective supply voltage connections VCC to the 5 volt operating voltage and their respective ground connections GND to ground.

In the preferred embodiment, pull-up resistors R1 and R6 are connected between the SIGNAL IN input signal on connection CM1+ and the 5 volt operating voltage, and between the SIGNAL OUT output signal on the output connection of comparator CM2 and the 5 volt operating voltage, respectively. The functions served by pull-up resistors R1 and R6 may be incorporated in circuitry upstream or downstream, respectively, from Applicant's circuit, and one or both of these resistors may not be required in the circuit.

An optional bypass capacitor C1 is connected between connection CM1− and ground and serves to keep input signal SIGNAL IN stable.

In the preferred embodiment, resistors R1, R5 and R6 have values of 49.9 kΩ, and resistor R4 has a value of 16.9 kΩ. Resistors R2 and R3 have values of 16.9 kΩ and 14.3 kΩ, respectively, giving the midpoint connection between R2 and R3 a value of 2.3 volts. Capacitor C1 has a value of 0.1 μf, and capacitor C2 has a value of 0.22 μf. Comparators CM1 and CM2 are both National Semiconductor model LP339. However, any standard comparator make and model that satisfies the design requirements can be used.

In normal operations, input signal SIGNAL IN comprises either dial pulses from the subscriber's telephone, a constant high voltage signal indicating on hook status, or a constant low voltage signal indicating off hook status. The high-to-low or low-to-high transitions will approximate square waves. False dial pulses and false off hook indications will appear as spikes on input signal SIGNAL IN.

In the equilibrium SIGNAL IN high state, connection CM1+ has a voltage of 5 volts. Connection CM1− has a value of 2.3 volts. The output of comparator CM1 is 5 volts. Capacitor C2 has a voltage across it of 5 volts. Connection CM2− has a value of 2.3 volts and connection CM2+ has a voltage of 5 volts. The output of comparator CM2, signal SIGNAL OUT, is 5 volts.

When signal SIGNAL IN transitions to a low state of 0.2 volts, a current path is created from the 5 volt operational voltage to ground through resistors R5, R4 and the comparator CM1 output and GND connections. There is a 0.2 volt drop across the comparator CM1 output and GND connections while this current path is conducting. When this current path is conducting, capacitor C2 discharges through resistors R5 and R4 in a time interval governed by the behavior of the RC circuit formed by resistors R4, R5 and capacitor C2 according to the familiar equation $$V(t) = V_f + (V_i - V_f)e^{-t/RC}$$

where $V_i$=initial equilibrium voltage across the capacitor, and $V_f$=final equilibrium voltage across the capacitor.

In the preferred embodiment, where resistors R4 and R5 are in parallel with respect to capacitor C2 during discharge, the denominator of the exponential becomes the time constant.

$$C2\left[\frac{R4R5}{R4+R5}\right] = 2.8 \text{ ms.}$$

The final equilibrium voltage across capacitor C2 after discharge, which is governed by the values of resistors R4, R5 and the 0.2 voltage drop across comparator CM1, is 1.4 volts.

Solving for the time at which the voltage across capacitor C2 discharges from the SIGNAL IN high state voltage of 5 volts to a value of 2.3 volts, the voltage at which comparator CM2 flips, yields about 3.6 ms. When the voltage across capacitor C2, and hence connection CM2+, drops below 2.3 volts, a current path is created from the 5 volt operational voltage to ground through resistor R6 and the comparator CM2 output. This causes signal SIGNAL OUT to drop from 5 volts to 0.2 volts. Thus, a falling edge of signal SIGNAL IN appears as a falling edge of signal SIGNAL OUT after a delay of 3.6 ms.

When signal SIGNAL IN transitions from a low to a high state, the current path through resistors R5, R4 and comparator CM1 becomes non-conducting. This allows capacitor C2 to charge from 1.4 volts to an equilibrium voltage of 5 volts through resistor R5 in a time interval governed by the behavior of the RC circuit formed by resistor R5 and capacitor C2. When capacitor C2 charges above 2.3 volts, the current path through resistor R6 and comparator CM2 becomes non-conducting, causing signal SIGNAL OUT to rise to 5 volts.

For the RC circuit formed by resistor R5 and capacitor C2 during charging, the time constant for the exponential equation is $$R5C2 = 11 \text{ ms.}$$

Solving for the time at which the voltage across capacitor C2 charges from the SIGNAL IN low state voltage of 1.4 volts to a value of 2.3 volts, the voltage at which comparator CM2 flips, yields about 3.6 ms. Thus, a rising edge of signal SIGNAL IN appears as a rising edge of signal SIGNAL OUT after a delay of 3.6 ms.

In the invention, the rising edge delay and the falling edge delay between the SIGNAL IN input signal and the SIGNAL OUT output signal are made approximately equal so as not to distort the pulse length. As can be seen, the 3.6 ms charging and discharging interval for capacitor C2 to reach the 2.3 volt level required for comparator CM2 to flip ensures that an input glitch of less than 3.6 ms will not be passed to the output signal.

The circuit can be tuned to meet a variety of power and timing requirements through judicious choices of the values of the components of the RC circuits in the system, i.e., resistors R4 and R5 and capacitor C2, and also the "trip" voltage values on negative connections CM1– and CM2–, as governed by the values of resistors R2 and R3.

While a preferred embodiment of a hook switch status analog glitch filter circuit has been particularly shown and described, it is not intended to be exhaustive nor to limit the invention to the embodiment disclosed. It will be apparent to persons having ordinary skill in the art that modifications can be made to the present invention without departing from the scope and spirit thereof. It is intended that the scope of the invention be defined by the claims appended hereto and their equivalents.

What is claimed is:

1. A hook switch status glitch filter circuit for use on a line card, the line card having a positive voltage operational power feed and a connection to ground, said glitch filter circuit comprising:

a voltage divider network formed by a first and a second resistor and connected between the positive voltage operational power feed and the connection to ground and having a midpoint connection that provides an intermediate voltage;

a first comparator receiving a circuit input signal at its positive voltage input connection and receiving said intermediate voltage at its negative voltage input connection, and connected to the positive voltage operational power feed at its supply voltage connection, and connected to the connection to ground at its ground connection;

a third resistor connected at one end to the output of said first comparator;

a fourth resistor connected at one end to the positive voltage operational power feed and connected at the other end to the other end of said third resistor;

a first capacitor connected at one end to the connection to ground and connected at the other end to said other end of said third resistor and to said other end of said fourth resistor; and a second comparator connected at its positive voltage input connection to said other end of said first capacitor and to said other end of said third resistor and to said other end of said fourth resistor, and connected at its negative voltage input connection to said intermediate voltage, and providing a circuit output signal at its output connection, and connected to the positive voltage operational power feed at its supply voltage connection, and connected to the connection to ground at its ground connection.

2. A hook switch status glitch filter circuit according to claim 1, further comprising a first pull-up resistor connected between said positive voltage input connection of said first comparator and the positive voltage operational power feed.

3. A hook switch status glitch filter circuit according to claim 2, further comprising a bypass capacitor connected between said negative input voltage connection of said first comparator and the connection to ground.

4. A hook switch status glitch filter circuit according to claim 1, further comprising a second pull-up resistor connected between said output connection of said second comparator and the positive voltage operational power feed.

5. A hook switch status glitch filter circuit according to claim 4, further comprising a bypass capacitor connected between said negative input voltage connection of said first comparator and the connection to ground.

6. A hook switch status glitch filter circuit according to claim 1, further comprising a first pull-up resistor connected between said positive voltage input connection of said first comparator and the positive voltage operational power feed, and a second pull-up resistor connected between said output connection of said second comparator and the positive voltage operational power feed.

7. A hook switch status glitch filter circuit according to claim 6, further comprising a bypass capacitor connected between said negative input voltage connection of said first comparator and the connection to ground.

8. A hook switch status glitch filter circuit according to claim 1, further comprising a bypass capacitor connected between said negative input voltage connection of said first comparator and the connection to ground.

* * * * *